United States Patent [19]

Kipp et al.

[11] Patent Number: 5,630,571

[45] Date of Patent: May 20, 1997

[54] EXHAUST FLOW CONTROL VALVE

[75] Inventors: Melvin D. Kipp, Flint; David A. Singer, Farmington; Mehrnam Sharif-Bakhtiar, Lansing; Frank Ament, Troy, all of Mich.

[73] Assignee: General Motors Corporation, Detroit, Mich.

[21] Appl. No.: 543,712

[22] Filed: Oct. 16, 1995

[51] Int. Cl.⁶ .............................. F16K 41/00; F16K 41/06
[52] U.S. Cl. .................... 251/214; 60/324; 251/305; 251/308; 277/102; 277/DIG. 6
[58] Field of Search ....................... 251/214, 305, 251/306, 308; 60/288, 324; 123/543, 547, 548, 552; 277/102, DIG. 6

[56] References Cited

U.S. PATENT DOCUMENTS

| | | | |
|---|---|---|---|
| 3,425,663 | 2/1969 | Priese | 251/214 |
| 3,774,879 | 11/1973 | Zink | 251/308 |
| 4,032,108 | 6/1977 | Kintner | 251/308 |
| 4,111,395 | 9/1978 | Sheppard | 251/308 |
| 4,321,341 | 11/1980 | Kuramoto et al. | 123/552 |
| 4,363,309 | 12/1982 | Ludwig | 123/552 |
| 4,558,874 | 12/1985 | Williams | 251/214 |
| 4,658,853 | 4/1987 | Pennington | 137/240 |
| 4,805,571 | 2/1989 | Humphrey | 123/316 |
| 5,217,041 | 6/1993 | Houston | 137/240 |
| 5,251,874 | 10/1993 | Coleman et al. | 251/214 |
| 5,309,707 | 5/1994 | Provol et al. | 60/39.03 |
| 5,342,019 | 8/1994 | Braun et al. | 251/305 |
| 5,375,622 | 12/1994 | Houston | 137/240 |
| 5,377,486 | 1/1995 | Servati et al. | 60/288 |
| 5,401,001 | 3/1995 | Cook et al. | 251/308 |
| 5,427,141 | 6/1995 | Ohtsubo | 137/595 |
| 5,433,073 | 7/1995 | Duret et al. | 60/288 |
| 5,445,248 | 8/1995 | Clark et al. | 137/312 |

FOREIGN PATENT DOCUMENTS

| | | | |
|---|---|---|---|
| 3707904 | 9/1988 | Germany | 251/305 |
| 4314938 | 11/1992 | Japan | 251/305 |

*Primary Examiner*—George L. Walton
*Attorney, Agent, or Firm*—Anthony Luke Simon

[57] ABSTRACT

An exhaust flow control valve operable over high temperature ranges, comprising: a cylindrical flow housing having a cylinder axis and defining a flow passage; a valve plate pivotably mounted within the cylindrical flow housing, wherein the valve plate has a first facing surface, a second facing surface and a perimeter surface and wherein the valve plate has a pivot axis perpendicular to cylinder axis; a first seat extending radially inward from a first approximate 180 degree portion of an inner perimeter of the cylindrical flow housing, wherein the first seat forms a first partial annular surface having a substantially constant width in a radial direction over an entire arcuate length of the first seat and wherein the first seat faces a first direction parallel to the cylinder axis; a second seat extending radially inward from a second approximate 180 degree portion of the inner perimeter of the cylindrical flow housing, wherein the second seat forms a second partial annular surface having a substantially constant width in a radial direction over an entire arcuate length of the second seat, wherein the second seat faces in a second direction opposite the first direction, wherein the first seat is on one side of the pivot axis and the second seat is on another side of the pivot axis opposite the one side, wherein the valve plate has a closed position at which the first facing surface seats against the first seat and the second facing surface seats against the second seat.

1 Claim, 2 Drawing Sheets

EXHAUST FLOW CONTROL VALVE

BACKGROUND OF THE INVENTION

Some automotive technologies require the use of a valve in the exhaust gas flow to aid in the control of emissions. For example, to meet some stringent emission requirements it has been proposed to include two catalytic converters in the vehicle, one of which is a warm-up converter and the other of which is a conventional converter. The warm-up converter operates before the engine is warmed up to improve the efficiency of the removal of undesired species in the exhaust gases until the conventional converter is warmed up and is sufficiently removing the undesirable species from the exhaust gases. Use of the warm-up converter becomes unnecessary once the conventional catalytic converter is warmed up. Depending on the warm-up converter structure, location or active catalyst formulation, continued use during operation of the vehicle may damage the converter or cause it to age prematurely.

To prevent damage to the warm-up converter, exhaust gases are rerouted after the warm-up period, preventing them from flowing into the warm converter. Thus, a valve must be provided in the exhaust system for valving exhaust gas flow, allowing the exhaust gas to flow into the warm-up converter during engine warm up operation and preventing exhaust gas from flowing into the warm-up converter after the warm up period. The valve must be capable of operating over a large temperature range, for example, from well below 0° C. to over 1000° C. Many existing valves simply are not robust enough to endure in the vehicle over such operating ranges. Other valves use ceramic structures that are durable but may be difficult to make and/or difficult to interface with the steel of the vehicle's exhaust system.

It is desirable that the valve be substantially sealed when closed to block exhaust flow from entering the start up catalytic converter and that the valve not allow escape of gas through its joints from the interior of the exhaust system.

One known type of butterfly valve shuts off gas flow by rotating the butterfly plate until the perimeter of the plate contacts the inner bore of the housing. With this design it is difficult to achieve a good seal over a large operating temperature range due to thermal expansion and contraction of the valve plate and of the valve housing. This design is further complicated by extremely tight dimensional tolerances, increasing valve cost. If tight tolerances are not maintained and/or the thermal expansion is not accounted for, the valve may not seal well when in the fully closed position or have other failings caused by the expansion and contraction of the valve plate over the extreme temperature range of operation.

Another known type of valve design provides two crescent shaped surfaces on the inner bore of the housing, one surface facing each direction, for the blade to seal against to stop flow past the blade. The thicknesses of the crescent surfaces start from nil and extend to maximum thickness at the part of the plate 90° from the pivot axis and approaches zero again on the other side of the pivot axis. This type of valve also suffers from leakage when in the closed position due to thermal expansion and contraction of the valve plate and flow housing and due to dimensional tolerance and process variations, creating gaps between the valve plate and the housing along the narrower portions of the crescent-shaped surfaces.

SUMMARY OF THE PRESENT INVENTION

It is an object of this invention to provide an exhaust bypass valve according to claim 1.

Advantageously, this invention provides an exhaust bypass valve that provides improved sealing characteristics against exhaust flow when the valve is closed, improved insensitivity to dimensional tolerance and process variations of the flow housing and the valve plate and improved insensitivity to dimensional variations due to thermal expansion and contraction over large operating temperature ranges.

Advantageously, in one example, this invention provides a valve for use in an exhaust system that has an improved sealing structure for the valve shaft bearing joints and that is durable over a wide range of temperatures such as occur when the valve is subjected to hot engine exhaust gas flow.

Advantageously, according to an example of this invention, the improving sealing characteristics of the valve that seal against exhaust flow when the valve is closed while maintaining insensitivity to dimensional variations due to tolerances and thermal expansion and contraction of the valve parts are provided by two arcuate seats on the inside of the flow housing wherein each seat forms an arc of almost 180°. The seats are equidistant from the center line of the housing and are diametrically opposed across a pivot axis of the valve plate. One seat faces one direction and the other seat faces the opposite direction so that, when the valve plate opens, the valve plate side that contacts one seat opens away from the one seat and the valve plate side that contacts the other seat opens away from the other seat. Each seat extends from the housing wall a predetermined distance over the entire length of the seat so that the valve plate seals against the seats. A dimensional tolerance and thermal expansion/contraction range between the perimeter of the valve plate and the inside surface of the flow housing wall can be as large as the predetermined distance with no adverse affects on the sealing characteristics.

Advantageously according to an example of this invention, the sealing of the bearing joint for the valve shaft achieved with a socket joint design that, in one example, includes a steel washer affixed to the valve shaft. The steel washer has a convex top annular surface. The socket joint also includes a ceramic washer, held in place within the housing, and including a concave annular surface surrounding the washer's central opening. The ceramic washer fits loosely around the valve shaft and receives the concave surface of the steel washer. The ceramic and steel washers remain engaged by a wave washer acting as a spring biasing the valve stem in a direction pressing the convex annular surface of the steel washer into the concave annular surface of the ceramic washer. The wave washer also maintains the ceramic washer against a housing structure, such as an end cap or bushing in the housing, to maintain a seal between the ceramic washer and the housing structure. In another example of this invention the steel washer has a concave annular surface and the ceramic washer has a convex annular surface that engages the concave annular surface of the steel washer to seal the fitting or bearing for the valve shaft.

DETAILED DESCRIPTION OF THE INVENTION

Figure 1:
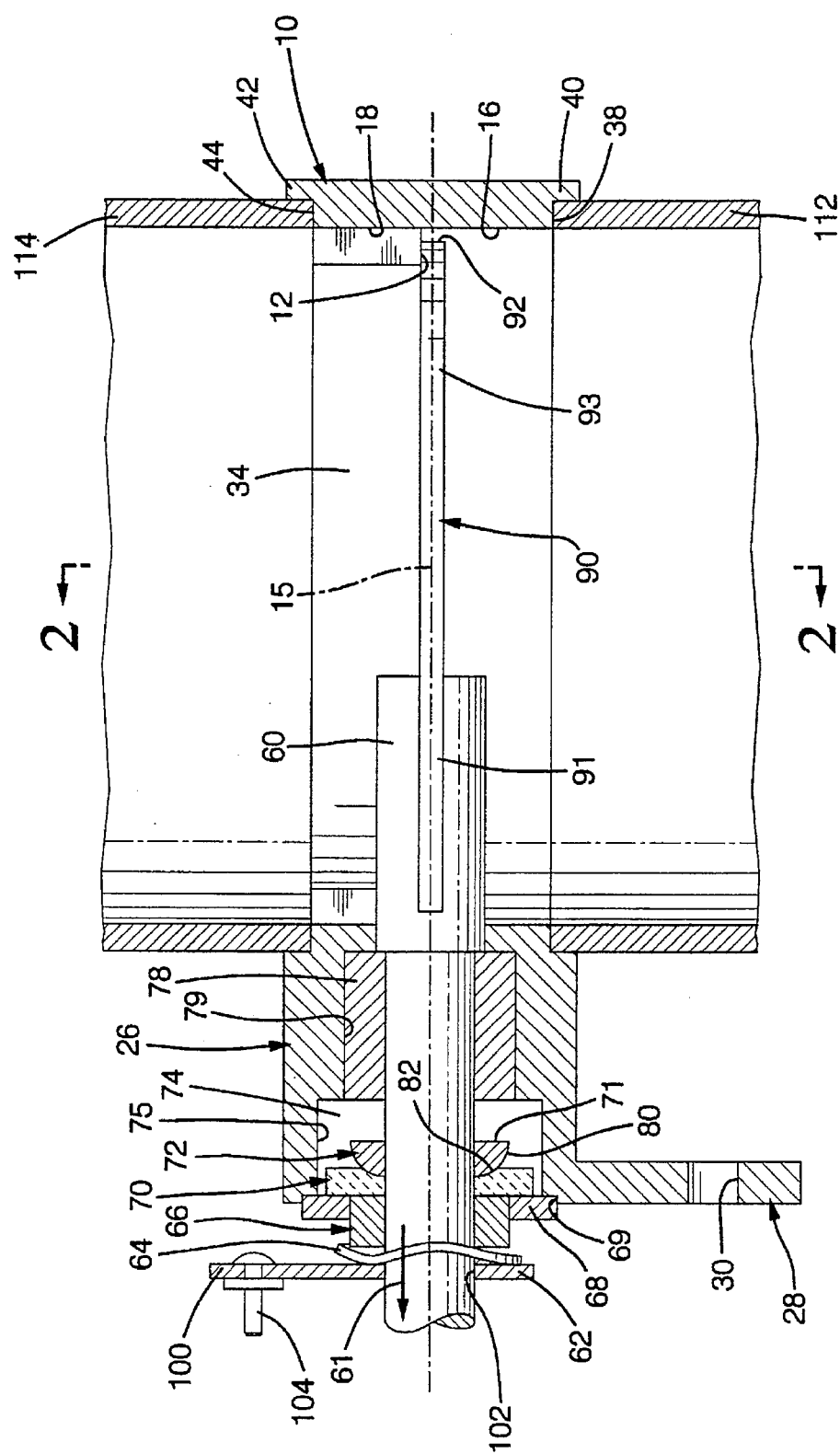
FIG. 1 illustrates a first cross section of an example valve according to this invention.
Figure 2:
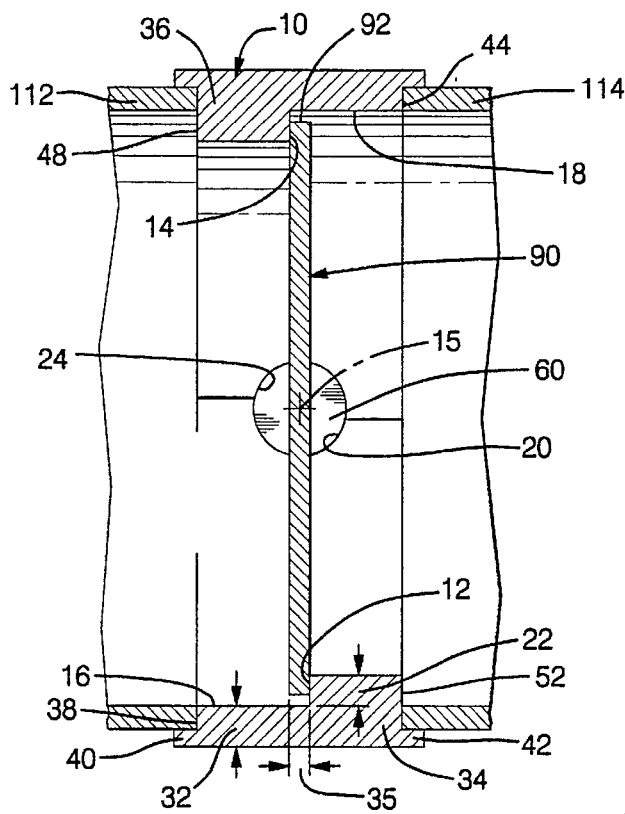
FIG. 2 illustrates a cross section along a plane indicated by arrows 2—2 of the example valve shown in FIG. 1.
Figure 3:
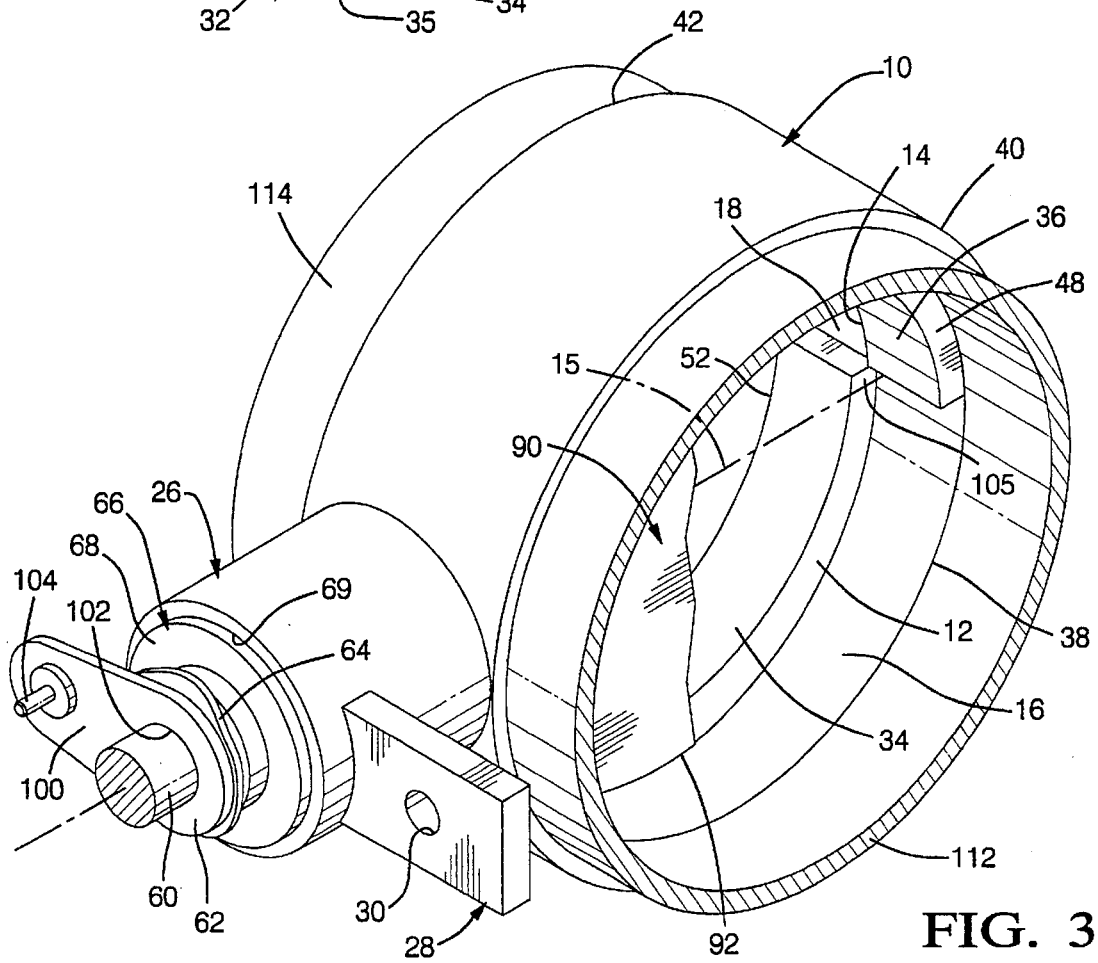
FIG. 3 illustrates another view of an example valve according to this invention.

Referring now to FIGS. 1, 2 and 3, the example housing for the valve according to this invention includes a flow passage housing 10, the stem housing 26 and a mounting bracket 28 with a mounting hole 30. The complete housing can be formed from an investment cast structure where the surfaces of the seats 12 and 14 do not need to be machined to allow a tight seal when the valve is closed.

Referring now also to FIG. 2, the seats 12 and 14 extend radially in from the inner wall of the flow housing, seat 12 extending in from the wall 16 on one side of pivot axis 15 and seat 14 extending in from the wall 18 on the other side of pivot axis 15. Seats 12 and 14 face opposite directions and as can be seen in FIG. 2, are spaced in the axial dimension of the flow housing apart by a distance 35 substantially equal to the thickness of the butterfly plate to be used in the valve. Each seat 12, 14 extends over almost 180° of arc along the inside wall of the flow passage and extends radially inward a substantially constant distance 22 at every point along the arc. Each seat has a portion, illustrated by reference 20 for seat 12 and by reference 24 for seat 14 where material is omitted to allow clearance for the valve plate shaft 60, which pivots along axis 15 when installed. The seats 12 and 14 are formed by thickening the portions 34, 36 of the interior wall of the housing. A cross section of the housing shows at the seats 12, 14 has an increased thickness of portions 34, 36 compared to the normal thickness 32 of the housing.

When the housing is installed, for example in an exhaust management system, a connecting tube 112 to other exhaust flow elements may be seated in the seat formed in the cylinder end 40 having narrow surface 38 over approximately 180° of its perimeter and wide surface 48 over the other approximate 180° of its perimeter. The wide surface 48 of the seat corresponds to the portion of wall 36 that forms seat 14.

Similarly, a connecting tube 114 may be seated in the other cylinder end 42 including narrow seat surface 44 over approximately 180° of the perimeter of the seat and wide surface 52 over the other approximate 180° of the perimeter. The wide surface 52 corresponds to the portion of wall 34 that forms seat 12.

The valve plate 90, which, in this example, is substantially circular in shape, is shown in a closed position. One side of a portion of valve plate 90 just inside the perimeter seats on seat 12, covering up most of the seat 12 and the opposite facing side of the valve plate 90 has a portion just inside the perimeter of the plate that seats on seat 14, similarly covering most of the seat 14. The valve plate's outer perimeter 92 is allowed to be spaced apart from the inner wall 16 shown without having detrimental sealing effects on the valve because the seat 12 extends radially inward a constant distance over its entire 180 degree arcuate extension. This allows for tolerance and process variations to housing and valve plate dimensions and also allowing for dimensional variations due to thermal expansion and contraction while still providing almost 360 degrees of sealing surface. Because the perimeter 92 of the valve plate is allowed to be spaced radially inward from wall 16, the thermal expansion of the plate 90 and the flow housing 10 need not exactly match. Also, because the seats 12, 14 extend radially inward a substantially equal distance over the entire 180 degree span of each seat 12, 14, exhaust flow leaks between the plate perimeter 92 and the inside wall 16, 18 such as may occur in valves with crescent shaped seats, are eliminated. It is noted that the valve according to this invention does not provide 100% stop of gas flow and such is not needed. For example, region 105, where the seats 12 and 14 stop short of the shaft axis 15 each by a distance equal to half of the thickness of the blade to allow room for the blade to pivot in the fully open position, allows an extremely small flow of gas past the plate when the plate 90 is in the closed position. However, this small amount of gas is inconsequential and cannot damage the start-up converter.

The valve plate 90 is mounted onto the valve stem or shaft 60 in a known manner, for example, a slot (not shown) in plate 90 fits around the end of the shaft 60, with the end of the shaft 60 located centrally in the slot. In the preferred example, the plate 90 is affixed to the shaft 60 by a laser welding process of a known type that can be done quickly to prevent warping of plate 90 due to generation of excess heat. Alternatively, the shaft 60 and plate 90 are attached by any one of a suitable number of known attachment methods for mounting butterfly valve plates to valve shafts. In the example shown the shaft 60 is pivotally mounted on only one side 91 of the plate 90. However, it is considered an equivalent alternative to extend the shaft 60 or otherwise provide for a pivotable mounting on the other side 93 of the plate 90. Such a pivotal mounting would be into the structure of the flow path housing 10 and would provide a seal against leakage of exhaust gas outside the housing.

FIG. 1 illustrates a cross section of the advantageous pivotable mounting structure according to this invention that provides seal of the valve against the leakage of exhaust gas from the exhaust gas flow passages, through the housing and pivotable mount, to the environment outside the enclosed gas system.

The mounting and sealing arrangement includes a first bushing 78, comprising, for example, Triballoy-400™ powder metal commercially available to those skilled in the art, press fit into a first bored opening 79 in the stem portion 26 of the housing. A second bored opening 75 axially adjacent to and coaxial with the first board opening 79, provides an interior working space 74 between the first bushing 78 and the second bushing 66. Steel washer 72 is within space 74 and is affixed to shaft 60, e.g., by press fit, so that it is located between the two bushings 78 and 66 when the valve is assembled. The washer 72 has an annular flat end 71 facing the bushing 78 and an annular convex shaped end 80 facing bushing 66. A ceramic washer 70 (i.e., alumina) is located between washer 72 and bushing 66. The ceramic washer 70 has an annular concave portion 82 shaped to receive the annular convex end 80 of washer 72. The washer 70 is neither rigidly attached to the housing 26 nor to the shaft 60.

The engagement of the concave surface 82 of the washer 70 with the convex surface 80 of the steel washer 72 forms an annular socket joint that seals when force in the axial direction of shaft 60 presses the steel washer 72 against the ceramic washer 70. Ceramic washer 70 is prevented from moving out of the housing 26 by radially extending portion 68 of bushing 66, which is press fit into a third opening 69 bored into the housing 26. In this example, the bushing 66 with its radially extending portion 68 are the closing structure for the interior working space 74. The ceramic washer provides a tight seal against both the stainless steel washer 72 and the flat annular shaped end cap extending portion 68 and/or bushing 66, preventing gas flow from escaping past the ceramic washer 70 into the outside atmosphere.

Bushing 66 helps provide a stable mounting for the shaft 60 and to close the space 74. A flat retainer 62 is press fit onto the shaft 60 and together with bearing 66 sandwiches a wave washer 64. The retainer 62 is positioned such that the wave washer is contracted in the axial direction and exerts spring force between the bushing 66 and the retainer 62, providing a bias force on the shaft 60 in the direction of arrow 61. The spring force provided by the wave washer biases the stainless steel washer 72 against the ceramic washer 70, sandwiching the ceramic washer 70 between the stainless steel washer 72 and the end cap 68 providing the gas seal for the bearing assembly.

Thus, while the gap between each bearing surface of the bushings 78 and 66 and the shaft 60 must be wide enough to allow for thermal expansion of the shaft 60 thus preventing the shaft 60 from being in air tight engagement with the bushing 78 or the bushing 66, the combination of the stainless steel washer 72, the ceramic washer 70 and the end cap 68, as biased by the wave washer 64, provide a gas seal for the bearing assembly.

An additional advantage of using the ceramic washer 70 is that it prevents fusion of the sealing parts in sliding contact during high temperature operation.

It is preferred that the wave washer 64 is pretreated with a high temperature lubricating solution such as molybdenum disulfide, commercially available to those skilled in the an under as MolyKote™. A suitable material for the bushing 66 is Triballoy 400™ powdered metal. The bushing 66 may be flush with the end cap/extension 68 on the side facing ceramic washer 70, but preferably extends past end cap/ extension 68 at least 0.100 inches on the other side so that the wave washer rides on the bushing 66 as opposed to the end cap/extension 68.

In a preferred embodiment, the retainer 62 is part of an actuation arm 100 shown, press fit onto the shaft 60 through a hole 102 in the arm 100. In this example, actuation arm 100 performs the function of retaining wave washer 64 and acts as an arm for actuator control of the valve plate position. The actuation arm 100 may include an actuation pin 104 of a type suitable for interfacing the arm with a solenoid or pneumatic valve actuator.

The retainer need not be the actuator arm 100 shown but may simply comprise a steel washer press fit onto the shaft 60, in which case the valve is actuated through any other suitable mechanism known to those skilled in the art.

We claim:

1. In an exhaust flow control valve comprising a cylindrical flow housing having a cylinder axis and defining a flow passage and a valve plate pivotably mounted within the cylindrical flow housing, also comprising a sealed pivotable mount for pivotably mounting the valve plate, the improvement wherein the sealed pivotable mount comprises:

a cylindrical extension of the cylindrical flow housing extending in a radial direction exterior of the flow passage, wherein the cylindrical extension defines a cavity with a first cavity portion closest to the flow passage having a first constant diameter and a second cavity portion extending from the first cavity portion away from the flow passage and having a second constant diameter greater than the first constant diameter;

a first bushing fixedly mounted to an inner peripheral wall of the first cavity portion;

a second bushing fixedly mounted at an end of the second cavity portion spaced apart from the first cavity portion;

a shaft attached to the plate and extending through the first bushing, the first and second cavity portions and the second bushing;

a metal washer rigidly affixed to the shaft within the second cavity portion, wherein the metal washer has one end forming an annular convex surface, wherein the one end faces away from the flow passage;

a ceramic washer having an opening through which the shaft extends and forming on one end an annular concave surface engageable with the annular convex surface of the metal washer, wherein the ceramic washer is located within the second cavity portion between the metal washer and a face of the second bushing facing the first bushing;

a retainer rigidly affixed to the shaft exterior of the first bushing with respect to the flow passage; and a spring located between the retainer and the second bushing, wherein the spring biases the shaft in a direction forcing engagement of the metal washer to the ceramic washer, wherein the metal washer seals against the ceramic washer and the ceramic washer seals against the second bushing, thereby providing a high sealing performance over a wide operating temperature range for preventing exhaust gas from escaping through the pivotable mount to an exterior of the flow passage.

* * * * *